United States Patent Office 2,727,075
Patented Dec. 13, 1955

2,727,075

ISOMERIZATION OF ORTHO-DICHLOROBENZENE

Leonard A. Mattano, Hammond, Ind., assignor to Standard Oil Company, Chicago, Ill., a corporation of Indiana No Drawing. Application November 15, 1949,
Serial No. 127,531

5 Claims. (Cl. 260—650)

This invention relates to a process for the preparation of meta-dichlorobenzene and more particularly, to a process for the conversion of ortho-dichlorobenzene predominantly to the meta-isomer and to the para-isomer.

Although numerous methods have heretofore been proposed and examined for the preparation of meta-dichlorobenzene (see for example E. H. Huntress, "Organic Chlorine Compounds," John Wiley and Sons, Inc., N. Y. (1948) pages 774–5), they have suffered from one or more of the disadvantages of being relatively expensive, difficult to operate and producing meta-dichlorobenzene in low yields.

It is an object of this invention to provide a simple and facile process for the isomerization of ortho-dichlorobenzene. Another object of this invention is to provide an economical catalyst for such a process. Still another object of this invention is to provide a process for the catalytic isomerization of ortho-dichlorobenzene to meta-dichlorobenzene. These and other objects of my invention will become apparent from the ensuing description thereof.

I have found that ortho-dichlorobenzene can be isomerized to produce principally meta-dichlorobenzene, together with somewhat smaller proportions of para-dichlorobenzene in the presence of aluminum chloride, which may optionally be promoted in its catalyst action by the presence of relatively small proportions of hydrogen chloride. In the process of the present invention ortho-dichlorobenzene, or a mixture containing the same, is brought into intimate contact with between about 5 and about 50 percent by weight or even more of aluminum chloride, optionally in the presence of about 1 to about 5 weight percent, based on the weight of aluminum chloride, of hydrogen chloride or materials furnishing hydrogen chloride, for example ethyl chloride or isopropyl chloride, at temperatures between about 100° C. and about 200° C. for a period of time sufficient to permit substantial isomerization of the ortho-dichlorobenzene, usually between about ¼ and about 15 hours. Pressures sufficient to maintain the liquid phase, usually between about 0 and 50 p. s. i. g., are employed. In general, I prefer to employ between about 20.0 and about 50.0 percent by weight of aluminum chloride, based on the ortho-dichlorobenzene and temperatures between about 120 and about 160° C., for example 140–150° C. I have observed that a high yield of meta-dichlorobenzene can be obtained by operating at 145° C. At the higher reaction temperatures, smaller proportions of catalyst and/or shorter reaction periods may be employed, while at lower reaction temperatures the converse is applicable.

The employment of granular or coarse aluminum chloride leads to the production of somewhat higher yields of meta-dichlorobenzene and somewhat less tar formation than were obtained with powdered, sublimed aluminum chloride. Although solvents or diluents such as are commonly employed with aluminum chloride may be employed in the reaction zone, I have observed that the desired isomerization reaction proceeds well in the absence of such diluents.

The following specific examples are given to illustrate the process of my invention. In these examples, a mixture of ortho-dichlorobenzene and aluminum chloride was stirred in a 500 ml. 3-neck flask equipped with a stirrer, thermometer and a reflux condenser. After heating at various temperatures and for a number of hours as illustrated in the table, the reaction mixture was poured over HCl-acidified crushed ice. The product was extracted with hexane, filtered and distilled. Infra-red analyses were then performed on the reaction products. The examples are tabulated below.

TABLE

*Isomerization of o-dichlorobenzene*

| Ex. | Starting Material (o-dichlorobenzene) o-dichlorobenzene | | | | Percent ortho, 96 | Percent meta, 0 | Percent para, 4 |
|---|---|---|---|---|---|---|---|
| | Catalyst | gms. | Time, hrs. | Temp., °C. | | | |
| 1 | coarse AlCl₃, 20 gms. | 100 | 6 | 100 | ------ | 15.0 | 4.0 |
| 2 | coarse AlCl₃, 50 gms. | 100 | 10 | 145 | 13.4 | 74.0 | 24.0 |
| 3 | Sublimed AlCl₃, 50 gms. | 100 | 12½ | 120 | 64.6 | 23.0 | 5.8 |
| 4 | ----do---- | 100 | 10 | 145 | 43.0 | 35.0 | 8.0 |
| 5 | Sublimed AlCl₃ +HCl, 50 gms. | 100 | 10 | 145 | 52.0 | 32.0 | 10.7 |
| 6 | Sublimed AlCl₃, 50 gms. | 100 | 5 | 172 | 68 | 25.5 | 5.2 |

It will be noted from the above examples that the process of the present invention provides a simple and facile procedure for the preparation of meta- and para-dichlorobenzene from ortho-dichlorobenzene.

Although it might be thought that liquid HF or HF-BF₃ would serve the same purpose as AlCl₃, I have found that this is not the case. In an experiment, ortho-dichlorobenzene (130 gms.), 200 gms. HF, and 72 gms. BF₃ were placed in a high pressure steel reactor fitted with valves and a gauge. The initial pressure at room temperature was 175 p. s. i. g. Since there was no decrease in pressure shortly after the reactants were mixed, this indicated that a complex between ortho-dichlorobenzene and HF-BF₃ was not formed. The reaction mixture was heated to 125–130° C. for 2 hours. The pressure varied between 470 and 510 p. s. i. g. After cooling and settling the product was separated from the HF-BF₃. The product was isolated in the usual manner and distilled. Infrared analysis for ortho-, meta-, paradichlorobenzene, and monochlorobenzene indicated that conversion did not occur. The starting material was recovered.

The isomerization products produced by the process of the present invention can be subjected to conventional separation and purification procedures to isolate substantially pure individual isomers and can, furthermore, be converted by known methods to produce a considerable variety of derivatives of interest and value in the field of organic chemistry. In particular, one may mention the conversion of the meta-dichlorobenzene product to resorcinol by treatment with steam in the presence of a silica catalyst at 550 to 850° C. (U. S. Patent 1,849,844); this process also yields some meta-chlorophenol. Another interesting synthesis which starts from meta-dichlorobenzene is chlorination to produce meta-dichlorobenzene hexachloride which can be demuriated to produce pentachlorobenzene (Van der Linden, Ber. 45, 411–418 (1912)). The para-dichlorobenzene produced by the process of this invention finds commercial application as a moth repellent.

Having thus described my invention, what I claim is:
1. A process for the conversion of ortho-dichloroben- zene to isomeric dichlorobenzenes containing a substantial proportion of meta-dichlorobenzene, which process comprises contacting a charging stock consisting essentially of ortho-dichlorobenzene with between about 5 and about 50 percent by weight of $AlCl_3$ and between about 1 and about 5 percent by weight of HCl, based on said $AlCl_3$, at an isomerization temperature between about 100° C. and about 200° C. under pressure sufficient to maintain the liquid phase for a reaction period between about ¼ and about 15 hours, and separating the resulting conversion product from the reaction mixture.

2. A process of producing metadichlorobenzene which comprises subjecting orthodichlorobenzene to hydrogen chloride and a catalyst comprising aluminum chloride under a super-atmospheric pressure and at a temperature between 100° C. and 200° C.

3. A process of producing metadichlorobenzene which comprises subjecting orthodichlorobenzene to hydrogen chloride and a catalyst comprising aluminum chloride under a super-atmospheric pressure and at an elevated temperature of at least 100° C. at which rearrangement of orthodichlorobenzene to form metadichlorobenzene takes place.

4. A process of producing metadichlorobenzene which comprises subjecting orthodichlorobenzene to hydrogen chloride and a catalyst comprising aluminum chloride under a super-atmospheric pressure and at an elevated temperature of at least 100° C. at which rearrangement of orthodichlorobenzene to form metadichlorobenzene takes place, and separating from the reaction mixture a fraction which is composed largely of metadichlorobenzene.

5. A process for the conversion of ortho-dichlorobenzene to isomeric dichlorobenzenes containing a substantial proportion of meta-dichlorobenzene, which consists in contacting ortho-dichlorobenzene with from 5 to 10 percent by weight of aluminum chloride at a temperature between the boiling point of the ortho-dichlorobenzene and 200° C., under pressure sufficient to maintain the liquid phase for a reaction period sufficient to effect substantial isomerization.

References Cited in the file of this patent

Leroy: "Bull, Soc. Chim. Paris," series 2, vol. 48 pages 214–5 (1887).

Friedel et al.: Ann. Chim. Phys. (6th series), vol. 10 (1887); pp. 411 to 424.

Holleman et al.; Rec. trav. Chim., vol. 30, pp. 323 to 328 (1911).

Roberts et al.; Jour. Chem. Soc. (London), 1927, p. 1855.

Phillips: Jour. Am. Chem. Soc., vol. 49, pp. 473 to 476 (1927).

Newton et al.; Ind. Eng. Chem., vol. 27, pp. 1397 to 1399 (1935).

Thomas: "Anhydrous Aluminum Chloride in Organic Chemistry," pp. 692–6 (1942).